Sept. 24, 1957 L. C. HOBBS 2,807,750
VOLTAGE MODIFYING NETWORK
Filed Aug. 10, 1950
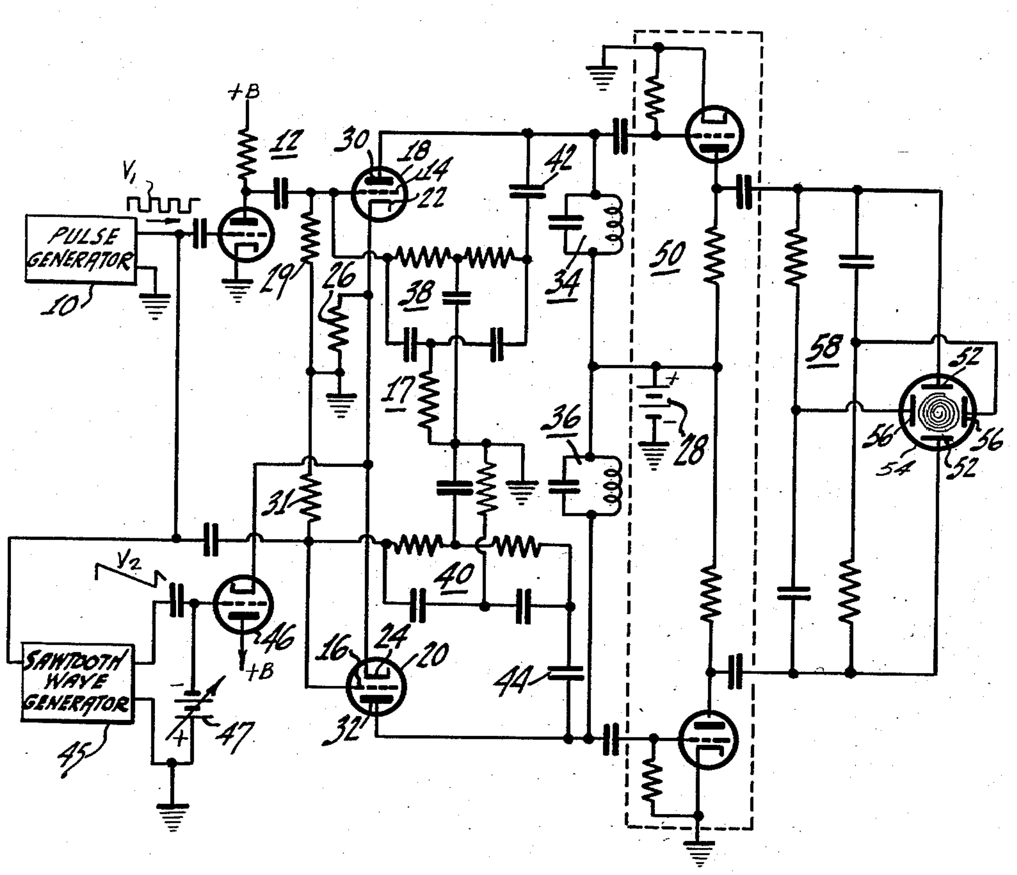
INVENTOR
LINDER C. HOBBS
BY Morris A. Rabkin
ATTORNEY 2,807,750
Patented Sept. 24, 1957

2,807,750

VOLTAGE MODIFYING NETWORK

Linder C. Hobbs, Haddonfield, N. J., assignor, by mesne assignments, to the United States of America as represented by the Secretary of the Navy Application August 10, 1950, Serial No. 178,695

7 Claims. (Cl. 315—24)

This invention relates to improvements in voltage modifying networks, and while not limited thereto finds particular application in cathode ray tube deflection systems.

It is well known that electric fields produced by sine wave voltages in phase quadrature can be combined in space quadrature to produce a rotating field. It is also known that a cathode ray beam subjected to a rotating deflection field will be deflected in a circular pattern. If the rotating field is amplitude modulated, the radius of the circle traced by the beam will vary in accordance with the modulation (see e. g. U. S. P. 2,436,872—Richardson et al.). Radius variations also can be obtained by applying the modulating voltage to a special electrode in the center of the cathode ray target. However, special tubes of this type are comparatively expensive and not readily available. Moreover, this expedient is inapplicable to other systems requiring amplitude-modulated rotating electric fields.

In many instances, the systems heretofore proposed for generating amplitude modulated phase displaced voltages have been unsatisfactory because the voltages derived therefrom contain objectionable distortion components. This distortion may have been present in the voltages applied to the system, or may arise in the system itself. For example, assume that one wishes to derive from a rectangular waveshape pulsating voltage, phase displaced and substantially "pure" or undistorted sine wave voltages, of frequency equal to the fundamental frequency of the pulsating wave, and of amplitude varying in accordance with a second or modulating voltage. In such case, the rectangular wave will be made up of the desired fundamental, combined with harmonics which must be eliminated if a pure sine wave is to be obtained. Moreover, if the system being used includes coupling transformers (see e. g. U. S. P. 2,135,171—Chireix), distortion may arise in the transformer.

It is one object of this invention to provide an improved network for converting a pulsating voltage into substantially undistorted, opposite phase sine wave voltages in a simple and efficient manner.

Another object of the invention is to provide an improved system for generating a variable amplitude rotating electric field.

A further object of the invention is the provision of an improved system for producing a variable radius circular trace on the screen of a cathode ray tube.

In accordance with the invention, the foregoing and other related objects and advantages are attained by amplifying a pulsating voltage in a push-pull circuit having negative feedback networks for suppressing distortion. A modulation voltage also can be applied simultaneously to the cathodes of two electron tubes in the push-pull circuit while the pulsating voltage is being applied to the control grids thereof. As will be shown hereinafter, this arrangement effectively eliminates distortion components present in the input voltages and also avoids the introduction of distortion in the system itself. Moreover, the cathode modulation arrangement is particularly suitable for use with so-called cathode follower circuits such as are frequently used in electronic apparatus.

A more complete understanding of the invention can be had by reference to the following description of illustrative embodiments thereof, when considered in connection with the accompanying drawing, the single figure of which is a schematic diagram of a system arranged in accordance with the invention for deflecting a cathode ray beam in a spiral pattern. Such a system might be used, for example, in channel identification apparatus of the type described in the above mentioned Richardson et al. patent.

The system shown comprises a rectangular waveshape pulse generator 10 adapted to provide a pulsating voltage $V_1$. Such a generator can assume any one of a number of different forms, such as a so-called multivibrator circuit, a light beam interrupter as show in the Richardson et al. patent, or the like.

The generator 10 is connected to supply pulses through a phase inverter circuit 12 to the control grid 14 of one tube 18 in a so-called "push-pull" amplifier circuit 17. The generator 10 also is connected directly to the control grid 16 of the other tube 20 in the push-pull circuit. Thus, the two tubes 18, 20 will receive pulses in phase opposition from the generator 10.

The tube cathodes 22, 24 are connected through a common cathode impedance 26 to the negative side of a source of operating voltage, shown as a battery 28. For simplicity, the connection from the resistor 26 to the battery 28 is shown by the conventional "ground" symbol. The usual grid return resistors 29, 31 are provided for the tubes 18, 20.

The tube anodes 30, 32 are connected to the positive terminal of the battery 28 through similar load impedances, shown as tuned circuits 34, 36. In some instances, these tuned circuits 34, 36 can be replaced by other impedance elements, such as resistors, as will be explained more fully hereinafter. In any event, it can be seen that the anode-cathode circuits for the tubes 18, 20 include separate anode impedances 34, 36 and a common cathode impedance 26.

A pulsating voltage applied to the tube grids 14, 16 will be reproduced as two opposite phase voltages at the tube anodes 30, 32. Since the tubes 30, 32 are operated in push-pull fashion, even numbered harmonics of the voltage from the source 10 will be cancelled out in the anode-cathode circuits. This, of course, is helpful in elimination of distortion.

To further reduce distortion, negative feedback networks 38, 40 are connected through coupling capacitors 42, 44 from the tube anodes 30, 32 to the control grids 14, 16. In the drawing, the feedback networks 38, 40 are shown as including so-called "symmetrical-T" signal rejection networks or filters of the type described in U. S. P. 2,106,785—Augustadt. As is explained in the Augustadt patent, networks of this type have the property of sharply attenuating a predetermined narrow band of frequencies. By "tuning" the networks 38, 40 to reject the fundamental frequency of the voltage applied to the tube grids 14, 16, negative feedback voltages will be applied to the control grids 14, 16 at all harmonics of the fundamental. Of course, it will be understood that the invention is not limited to the use of "symmetrical-T" networks in the feedback circuit, since other filtering networks having narrow-band signal rejection characteristics could as well be used.

It should be noted that the use of selected frequency negative feedback has special significance when used with a push-pull circuit in order to reduce or eliminate distorting harmonics. While such feedback networks alone will have a tendency to reduce distortion, most filtering networks do not have absolute rejection or acceptance characteristics, but only give preference to signals of one frequency over those of another frequency. That is, the attenuation effect will predominate at the selected frequency, but will also be present (in diminishing amount) on both sides of the selected frequency. Therefore, the action of the filters alone might not eliminate all harmonic distortion without very critical design and adjustment. However, by arranging the amplifier tubes 18, 20 in push-pull, second harmonics of the fundamental frequency applied to the control grids 14, 16 will be eliminated. Therefore, the negative feedback effect of the networks 38, 40 actually is required only to eliminate the third and higher odd numbered harmonics. At those frequencies, very little attenuation will occur in the networks 38, 40, and harmonic distortion will be substantially eliminated. With the arrangement shown, it has been found that a rectangular wave applied to the control grids 14, 16 can be reproduced as substantially pure sine wave voltages at the tube anodes 30, 32.

In accordance with a further feature of the invention, the sine wave voltages developed at the tube anodes 30, 32 can be amplitude modulated by applying a modulating voltage across the cathode load impedance 26. This arrangement of the modulation input is of further benefit from the standpoint of avoiding distortion effects. In the conventional balanced modulator, where the modulating voltage is applied through a coupling transformer, third harmonic distortion of the modulating voltage tends to arise in the transformer, especially at low frequencies. While screen grid modulation might be used with multigrid tubes, this expedient is not always satisfactory since it may require additional amplification of the modulating voltage. If the modulating voltage source has a so-called cathode-follower output stage, the use of cathode modulation, as shown, is helpful in avoiding impedance matching problems, as well as in handling very low frequency modulating voltages.

In the present example, the modulation voltage is a "negative-going" sawtooth voltage $V_2$, obtained from a sawtooth wave generator 45 such as a relaxation oscillator or the like. Where synchronization is needed between the modulation pattern and the sinewave, the pulse generator 10 can be used as a source of trigger pulses for the sawtooth generator 45, as shown.

From the sawtooth generator, the wave $V_2$ is applied to the push-pull amplifier 17 through a cathode-follower circuit comprising a tube 46 and the cathode load resistor 26 of the amplifier 17. The tube 46 serves both as a modulation voltage source and as a bias control for the push-pull tubes 18, 20. By adjusting the bias on the tube 46, by means of a variable negative voltage supply 47 or the like, one can adjust the amplifier tube biases simultaneously.

In the present case, the voltage at the tube cathodes 22, 24 at the beginning of each sawtooth wave cycle is made sufficiently positive to cut the tubes 18, 20 completely off. As the sawtooth voltage $V_2$ becomes slightly more negative, very small pulses of current will begin to flow through the tubes 18, 20 (on the "peaks" of the voltage wave $V_1$). At this time, the tubes will be operating as so-called class C amplifiers. When the tubes 18, 20 are operated class C, tuned circuits are required for the impedances 34, 36, as shown. However, it has been found that where only 75 percent modulation is required, tuned circuits need not be used. The combined action of the push-pull arangement of the tubes 18, 20 can be operated in so-called class AB fashion (current flowing slightly more than half of each input cycle of $V_1$), and substantially pure sine wave voltages will be obtained at the tube anodes 30, 32.

As the sawtooth voltage $V_2$ applied to the tube cathodes 22, 24 becomes more negative, the grid-to-cathode voltages of the tubes 18, 20 will become less negative. As more and more tube current flows during each cycle of the voltage $V_1$, the amplitudes of the tube output voltages also will increase. Thus, the sine wave voltages at the tube anodes 30, 32 will increase from zero to some maximum value during each sawtooth cycle $V_2$, and then drop abruptly back to zero, providing 100 percent modulation of the sinewave.

The output voltages of the tubes 18, 20 are further amplified in a conventional push-pull amplifier 50. The output of the amplifier 50 is connected directly to one set of deflection plates 52 in a cathode ray tube 54. A second set of deflection plates 56 in the tube 54 is connected to the amplifier 50 through a ninety-degree phase shift network 58. For simplicity, other details of the cathode ray tube 54 have been omitted from the drawing.

In the network 58, the opposite phase voltages from the amplifier 50 both are shifted in phase 90° and in opposite directions. Accordingly, the cathode ray tube deflection plates 52, 56 will receive quadrature phase related voltages of amplitudes which vary in accordance with the sawtooth voltage from the source 45. This, of course, will provide the desired spiral trace on the cathode ray tube screen, as shown.

Among the many possible applications of the invention, in addition to those already referred to, mention may be made of radio wave direction finding systems. Such systems may involve a mechanically rotated directional antenna, or a directional antenna array with a goniometer-type "rotating" mechanism (see e. g. U. S. P. 2,237,604—Marique; 2,408,039—Busignies). The cathode ray beam in a cathode ray tube can be deflected in a circular pattern in synchronism with the antenna rotation while the radius of the circle is being "modulated" in accordance with the signals received at the antenna.

The circle generator and radius modulator of the present invention is particularly suitable for a system of this type. The rate of antenna rotation usually is quite low, making it difficult to provide undistorted circular deflection of the cathode ray beam. As has already been described, the present invention is particularly suitable for low frequency operation.

It will be understood that the modulating voltage can be of any waveshape to obtain a circle whose radius varies as a function of the modulating voltage.

Since many changes could be made in the system shown and described, all within the scope and spirit of the invention, the foregoing is to be construed as illustrative, and not in a limiting sense.

What is claimed is:

1. A system for converting a pulsating voltage and a second voltage into opposite-phase sinewave voltages of frequency equal to the frequency of said pulsating voltage and of amplitude varying as a function of said second voltage, said system comprising a pair of electron tubes each having an anode, a cathode and a control grid, means to apply said pulating voltage to said tubes in phase opposition, means to apply said second voltage to both said cathodes simultaneously, an anode-cathode circuit for each said tube, each said circuit including a separate impedance connected to each said anode and an impedance connected in common to both said cathodes, and a feedback circuit for each said tube connecting the anode to the control grid thereof, said feedback circuit including a signal-rejection filter, each said filter being tuned to attenuate said frequency of said pulsating voltage.

2. A system as defined in claim 1 wherein said impedance connected to said anodes comprise parallel-resonant circuits both tuned to resonance at said frequency of said pulsating voltage.

3. A system as defined in claim 2 including means normally biasing both said tubes beyond cutoff, and wherein said second voltage comprises a sawtooth waveshape voltage.

4. A system for producing a variable radius circular trace on the screen of a cathode ray tube of the type having orthogonal beam deflection means, said system comprising a pulsating voltage source, a pair of electron tubes each having an anode, a cathode, and a control grid, means coupling said control grids to said voltage source to apply pulsating voltages from said source to said control grids in phase opposition, a source of voltage of varying amplitude, means coupling said varying voltage source to both said tube cathodes, anode-cathode circuits for said tubes, said circuits including first impedance elements connected one to each said anode and a second impedance element connected in common to both said cathodes, a feedback circuit for each said tube connecting the anode to the control grid thereof, each said feedback circuit including a signal-rejection filter network having a signal-rejection frequency equal to the frequency of said pulse source, and connections from said tube anodes to said beam deflection means, said connections including means to derive from the voltages at said tube anodes a first pair of opposite phase voltages and a second pair of opposite phase voltages displaced in phase ninety degrees from said first pair of voltages.

5. Apparatus as defined in claim 4 wherein said first impedance elements comprise parallel resonant circuits tuned to said frequency of said pulsating voltage source.

6. Apparatus as defined in claim 4 wherein said coupling means connected to said cathodes includes a cathode follower circuit comprising an electron tube having an anode-cathode circuit which includes said second impedance element.

7. In a system for deriving substantially undistorted sinewave voltages from rectangular waveshape voltage pulses, in combination, a source of periodically recurring pulses of rectangular waveshape, a pair of electron tubes each having an anode, a cathode and a control grid, means to apply pulses from said source to said grids in phase opposition, and feedback circuits for each said tube connecting the anode to the cathode thereof, each said feedback circuit including a signal-rejection filter adapted to attenuate signals of a predetermined narrow band of frequencies including the recurrence frequency of said pulses.

References Cited in the file of this patent

UNITED STATES PATENTS 2,312,761 Hershberger ---------- Mar. 2, 1943
2,461,144 Cook ---------- Feb. 8, 1949